US008317002B2

(12) United States Patent
Zhou et al.

(10) Patent No.: US 8,317,002 B2
(45) Date of Patent: Nov. 27, 2012

(54) SYSTEM OF SMART COLLOIDAL DAMPERS WITH CONTROLLABLE DAMPING CURVES USING MAGNETIC FIELD AND METHOD OF USING THE SAME

(75) Inventors: Gangyi Zhou, Irvine, CA (US); Lizhi Sun, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1145 days.

(21) Appl. No.: 11/948,606

(22) Filed: Nov. 30, 2007

(65) Prior Publication Data

US 2008/0135361 A1 Jun. 12, 2008

Related U.S. Application Data

(60) Provisional application No. 60/873,841, filed on Dec. 8, 2006.

(51) Int. Cl.
F16F 15/03 (2006.01)
(52) U.S. Cl. ............. 188/267; 188/267.2; 252/62.51 R; 252/62.55
(58) Field of Classification Search ............. 188/267, 188/267.1, 267.2, 266.1, 268; 436/527; 516/100, 516/33, 34, 79, 95
See application file for complete search history.

(56) References Cited

U.S. PATENT DOCUMENTS

| 3,047,507 | A | * | 7/1962 | Winslow | 252/75 |
|---|---|---|---|---|---|
| 4,280,918 | A | * | 7/1981 | Homola et al. | 252/62.51 R |
| 4,351,515 | A | * | 9/1982 | Yoshida | 267/225 |
| 4,687,596 | A | * | 8/1987 | Borduz et al. | 252/510 |
| 4,992,190 | A | * | 2/1991 | Shtarkman | 252/62.52 |
| 5,176,368 | A | * | 1/1993 | Shtarkman | 267/140.14 |
| 5,354,488 | A | * | 10/1994 | Shtarkman et al. | 252/62.56 |
| 5,424,041 | A | * | 6/1995 | Kishimoto | 422/122 |
| 5,552,111 | A | * | 9/1996 | Kishimoto | 422/5 |
| 5,573,088 | A | * | 11/1996 | Daniels | 188/267 |
| 5,578,238 | A | * | 11/1996 | Weiss et al. | 252/62.52 |
| 5,645,752 | A | * | 7/1997 | Weiss et al. | 252/62.54 |
| 5,925,288 | A | * | 7/1999 | Umamori et al. | 252/572 |
| 6,052,992 | A | * | 4/2000 | Eroshenko | 60/509 |
| 6,615,959 | B2 | * | 9/2003 | Eroshenko | 188/268 |
| 6,780,555 | B2 | * | 8/2004 | Uchida et al. | 430/106.2 |
| 6,886,819 | B2 | * | 5/2005 | Kintz et al. | 267/140.14 |
| 7,140,478 | B2 | * | 11/2006 | Barvosa-Carter et al. | 188/267 |

(Continued)

OTHER PUBLICATIONS

C. V. Suciu, T. Iwatsubo, and S. Deki, Investigation of a colloidal damper, Journal Colloid and Interface Science 259 (2003) pp. 62-80.

*Primary Examiner* — Bradley King
*Assistant Examiner* — Thomas Irvin
(74) *Attorney, Agent, or Firm* — Marcus C. Dawes; Daniel L. Dawes

(57) ABSTRACT

An apparatus includes a damper, a source of magnetic field coupled to the damper, a colloidal ferro-fluidic damping medium disposed in the damper, a sensor installed on the host structure to measure vibrations, and a vibration control circuit. The output of the sensor is fed back to the control circuit, which outputs a command signal to the source of the magnetic field applied to the damper to change the magnetic field in the damper as well as its damping curve so that the dynamic performance of the host structure installed with the damper is changed automatically to yield maximum vibration mitigation.

20 Claims, 13 Drawing Sheets

U.S. PATENT DOCUMENTS

| | | | |
|---|---|---|---|
| 7,332,351 B2 * | 2/2008 | Tan et al. | 436/524 |
| 7,413,063 B1 * | 8/2008 | Davis | 188/267.1 |
| 7,648,938 B2 * | 1/2010 | Miyashita et al. | 502/182 |
| 7,670,623 B2 * | 3/2010 | Kotha et al. | 424/489 |
| 7,767,301 B2 * | 8/2010 | Galaitsis | 428/402.21 |
| 7,770,701 B1 * | 8/2010 | Davis | 188/267.1 |
| 2003/0154865 A1 * | 8/2003 | Zornes | 96/143 |
| 2004/0084263 A1 * | 5/2004 | Kintz et al. | 188/267 |
| 2004/0173422 A1 * | 9/2004 | Deshmukh et al. | 188/267.2 |
| 2009/0308705 A1 * | 12/2009 | Suciu | 188/268 |
| 2010/0012880 A1 * | 1/2010 | Rampersaud et al. | 252/62.51 R |
| 2010/0063263 A1 * | 3/2010 | Hennig et al. | 536/23.1 |
| 2010/0193305 A1 * | 8/2010 | Suciu | 188/268 |

* cited by examiner

1. AT NANOSCALE:

NANOFLOW MECHANISM:

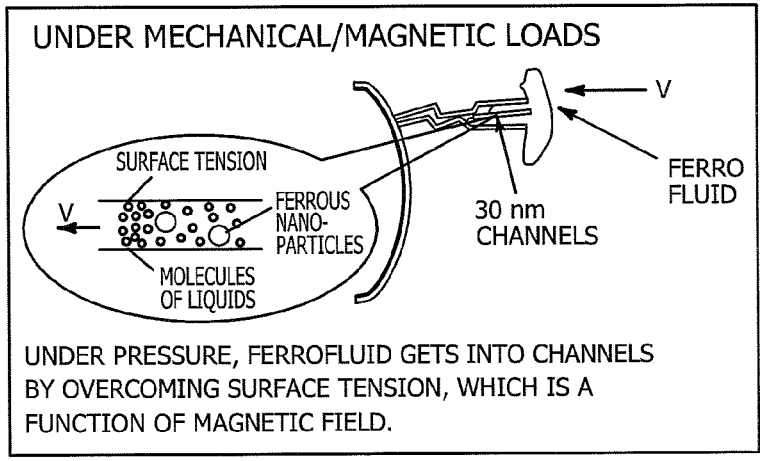

UNDER PRESSURE, FERROFLUID GETS INTO CHANNELS BY OVERCOMING SURFACE TENSION, WHICH IS A FUNCTION OF MAGNETIC FIELD.

NANO-MAGNETOSTRICTION:

NANO-CHANNELS DEFORM DUE TO THE GIANT MAGNETOSTRICTIVE EFFECT OF TERFENOL-D CORES.

2. AT MICROSCALE:

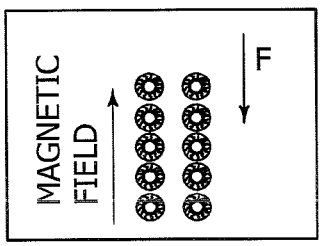

POROUS MICROPARTICLES FORM CHAINS ALONG THE DIRECTION OF MAGNETIC FIELD TO RESIST VISCOUS FLOW.

*FIG. 1C*

SYSTEM OF SMART COLLOIDAL DAMPERS WITH CONTROLLABLE DAMPING CURVES USING MAGNETIC FIELD AND METHOD OF USING THE SAME

RELATED APPLICATIONS

The present application is related to U.S. Provisional Patent Application Ser. No. 60/873,841, filed on Dec. 8, 2006, which is incorporated herein by reference and to which priority is claimed pursuant to 35 USC 119.

BACKGROUND OF THE INVENTION

1. Field of the Invention

The invention is directed to colloidal dampers, smart dampers, magnetic fluid, semi-active vibration control.

2. Description of the Prior Art

The key factor to reduce the durability of current dampers is the failure of rubber materials used for seal purpose. The fundamental mechanism for current state of the art dampers to dissipate external mechanical energy is to convert it into heat. As a consequence, the temperature of current dampers rise very quickly and the dampers are operated at high temperature levels. The higher temperature will derogate rubber materials used in dampers and cause material failure. In addition, temperature change also derogates the damping capacity of damping medium in dampers. Thus, currently either a cooling methodology or high-performance rubber materials are used to improve durability of dampers.

Besides heat generation, current hydraulic dampers possess low damping efficiency, which is defined by the ratio of the dissipated energy per cycle and the input energy during loading phase. The reason is that inner pressure inside the dampers reduces the effective area of damping forces. By theoretical analysis, the efficiency of hydraulic dampers without high pressure nitrogen chambers is $$\eta = 1 - \left(\frac{D_{pr}}{D_p}\right)^2,$$

where $D_{pr}$ and $D_p$ are the diameters of piston rods and pistons, respectively. For commercial hydraulic dampers, the rod should have sufficient cross area to transfer damping forces and, therefore, the efficiency for current hydraulic dampers can rarely exceed 50%. To increase damping efficiency, valves with a high pressure drop during loading phase and a low pressure drop during unloading phase are widely used. However, utilization of such valves makes damping curves unsmooth or ragged and increases the fabrication cost of dampers. If a nitrogen chamber is used, damping curves become smooth but damping efficiency becomes even smaller.

Dampers with on-demand controllable damping curves are essential components in an adaptive vibration control system. However, currently, such dampers, e.g., magnetorheological fluid (MRF) dampers, are primarily hydraulic dampers, which dissipate energy by an internal friction mechanism (viscosity) of the fluid passing through orifices. Thus, they also convert all external energy into heat and they have all the above disadvantages of hydraulic dampers.

What is needed is some kind of a damper which is characterized by low heat generation and possesses high damping efficiency without sacrificing the smoothness in the damping curves and has a low fabrication cost. Further what is needed is some kind of a damper in which the damping curves are on-demand controllable, so that such dampers would be material elements in designs which significantly enhance adaptive vibration control systems.

BRIEF SUMMARY OF THE INVENTION

The illustrated embodiment of the invention is an apparatus for use on a host structure comprising: a damper; a source of magnetic field coupled to the damper; a colloidal magnetic fluid damping medium disposed in the damper; a sensor installed on the host structure to measure vibrations; and a vibration control circuit, an output of the sensor being fed back to the control circuit, which outputs a command signal to the source of the magnetic field applied to the damper to change the magnetic field in the damper as well as its damping curve so that the dynamic performance of the host structure installed with the damper is changed automatically to yield maximum vibration mitigation.

The colloidal magnetic fluid damping medium is characterized by an on-demand controllable loss-factor.

In one embodiment the colloidal magnetic fluid damping medium comprises a mixture of nanometer-sized ferrous particles and micrometer-sized porous silica particles with ferrous cores in light mineral oil.

In another embodiment the colloidal magnetic fluid damping medium comprises mixture of nanometer-sized ferrous particles and micrometer-sized porous silica particles in water.

In one embodiment the porous silica particles have micrometer sized ferrous giant magnetostrictive cores and with long organic chains on the surface to provide nano-channels.

The vibration control circuit is arranged and configured to control the damper to provide adaptable vibration In one embodiment the porous silica particles have micrometer sized ferrous giant magnetostrictive cores and with long organic chains on the surface to provide nano-channels.

The vibration control circuit is arranged and configured to control the damper to provide adaptable vibration reduction and NVH (noise, vibration and harness) improvements of high performance vehicles, adaptive vibration control for seismic protection of civil structures, vibration control of apparatus, or vibration control of aero-structures.

In one embodiment the colloidal magnetic fluid damping medium comprises Terfenol-D particles or ferrous particles (diameter of 0.5.mu.m) coated with a silica layer by physical deposition methods, wherein the coated Terfenol-D particles or cores are reacted with n-alkylchlorosilanes to produce organic and hydrophobic long chains, which fold automatically to form a dense network with a multiplicity of nanometer-sized channels to form fabricated porous particles which are dispersed as nanometer-sized particles by being blended into light mineral oils or water.

The magnetic fluid is comprised of the nanometer-sized ferrous particles dispersed into a fluid, when subjected to the magnetic field and cyclic mechanical loading, is forced to flow into the nano-channels of the porous particles, and to form clusters of porous particles with a size varying from 2 to 10,000 molecules depending on the temperature and the motion of the fluid, and where the nano-flow and Kundsen number is less than 0.01, the clusters being at least in part oriented along the channels to form strips, flowing with boundary and inter-strip slip.

In one application the host structure is a vehicle, and the embodiment further comprises a power amplifier, a plurality of the corresponding sensors, sources and dampers used as shock absorbers installed on the vehicle to isolate it from vibration, the plurality of sensors installed on the vehicle to measure the vibrations, the outputs of the sensors being communicated to the control circuit, where a control strategy is stored, where by referring the instant vibrations and the vibration history the control circuit generates output command signals to the power amplifier to change the electrical currents to the plurality of magnetic field sources, the damping curves of the dampers being changed according to the plurality of command signals from the control circuit and the dynamic performance of the vehicle being changed to adaptively mitigated vibration.

The illustrated embodiment of the invention is also characterized as a colloidal magnetic fluid damping medium for use in a damper comprising a suspension of nanometer-sized ferrous particles and micrometer-sized porous silica particles in a fluid.

In one embodiment the porous silica particles have a ferrous core and where the fluid comprises a mineral oil.

In still another embodiment the porous silica particles are nonferrous and where the fluid comprises water.

In yet another embodiment the porous silica particles comprise solid silica cores reacted with n-alkylchlorosilanes to produce a silica core with an organic coating of nano-channels.

The illustrated embodiment of the invention is also characterized as a method comprising the steps of generating a magnetic field of a selective strength; subjecting a colloidal magnetic fluid damping medium in a damper to the generated magnetic field; and cyclically mechanical loading the damper to force a magnetic fluid in the damping medium to flow into nano-channels of porous particles included in the damping medium to determine the viscosity of the damping medium dependant on the selected magnetic field strength.

The damping medium is constituted to have an interaction between fluid molecules sufficiently high when cyclically mechanical loading to promote capture or aggregation of the porous particles into clusters with a size varying from 2 to 10,000 molecules, the size of the clusters being dependant on the temperature and the motion of the damping medium.

The damping medium is constituted to have a nano-flow Knudson number is less than 0.01 when cyclically mechanical loading so that the clusters are normally oriented along the channels of the porous particles to form strips, flowing with boundary and inter-strip slip.

The method further comprises the steps of sensing vibrations with a sensor installed on a host structure; and generating a command signal to a source of the magnetic field applied to the damper to change the magnetic field in the damper as well as its damping curve so that the dynamic performance of the host structure installed with the damper is changed automatically to yield maximum vibration mitigation.

The step of generating a command signal comprises generating a command sign to provide an on-demand controllable loss-factor.

The step of generating a command signal comprises controlling the damper to provide adaptable vibration reduction and NVH (noise, vibration and harness) improvements of high performance vehicles, adaptive vibration control for seismic protection of civil structures, vibration control of method, or vibration control of aero-structures.

The host structure may be a vehicle, and the method further comprising the steps of providing dampers as shock absorbers installed on the vehicle to isolate it from vibration, measuring the vibrations, communicating the measured vibrations to a control circuit, where a control strategy is stored, referring to the measured vibrations and a vibration history to generate a corresponding plurality of command signals to a corresponding plurality of power amplifiers or a multiplexed power amplifier, generating a plurality of corresponding coil currents from the amplifier or amplifiers, changing a corresponding plurality of electrical currents to corresponding magnetic field sources for each damper, the damping curves of each dampers being changed according to the corresponding command signal from the control circuit and changing the dynamic performance of the vehicle to adaptively mitigated vibration.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1c is a diagram illustrating the nano-flow mechanism of the damping material from nano- to micro-scale.

FIG. 6b is a graph of the hysteresis loops of the damping material in the configuration space of force-displacement with the colloidal damper of FIG. 3a.

FIG. 7 is a graph of the temperature as a function of time of the conventional hydraulic damper of FIG. 6a and the colloidal damper of FIG. 3a.

FIG. 8 is a graph of the temperature rise or change as a function of time of the conventional hydraulic damper of FIG. 6a and the colloidal damper of FIG. 3a.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

What is disclosed is a type of colloidal damping media with on-demand controllable loss-factor and a methodology to utilize the damping media for the development of colloidal dampers with on-demand controllable damping forces.

Figure 1A:
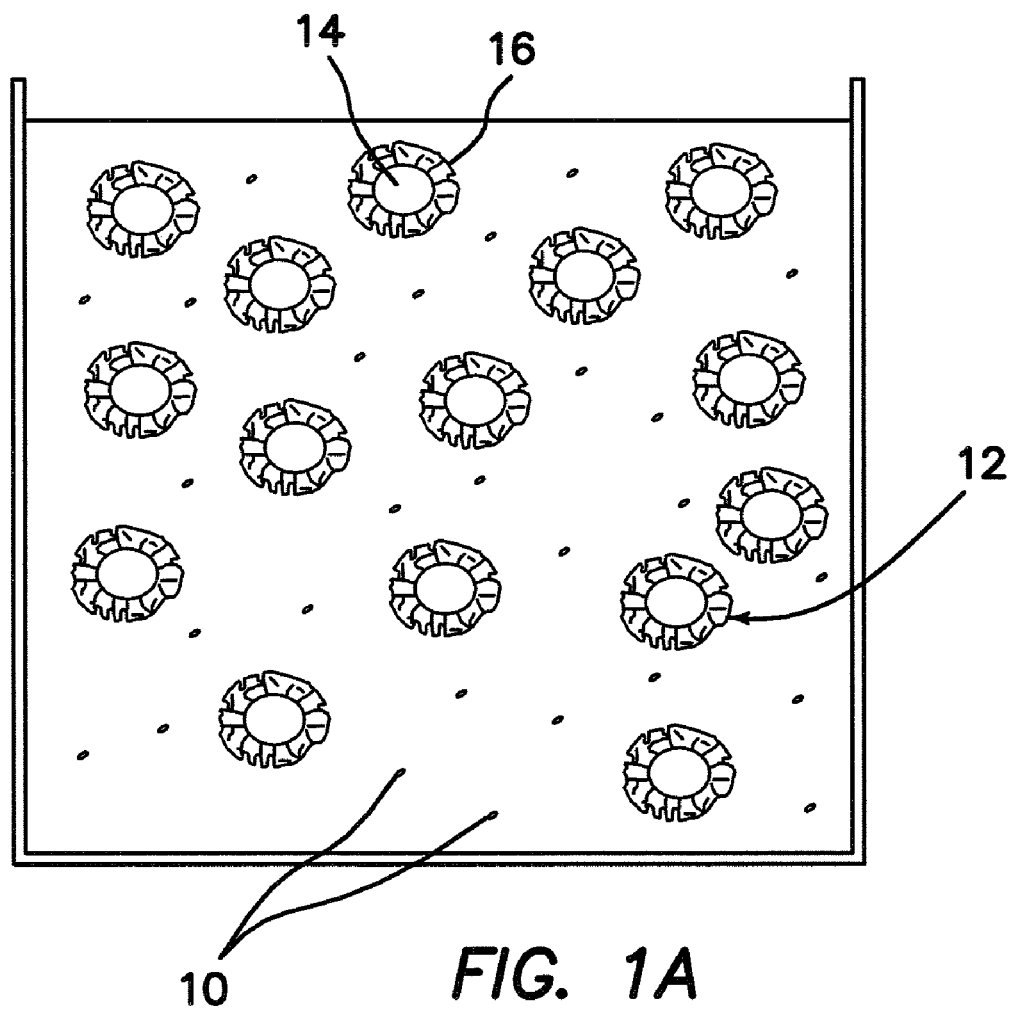
FIG. 1a is a diagram of the constituents in colloidal damping materials according to the invention. Porous micro-particles are suspended in distilled water in a first embodiment.

In one embodiment as shown in the diagram of FIG. 1a the damping medium is composed of water-based magnetic fluids 12, which is mixture of nanometer-sized ferrous particles 10 (not shown) and distilled water, and micrometer-sized porous silica particles 16, which collectively comprise the damping material or fluid 36. The porous particles 16 are prepared by reacting n-alkylchlorosilanes with small silica cores 14 sold by Mallinckrodt Baker, Inc., Phillipsburg N.J., http://www.mallbaker.com/, under the product name Bakerbond Wide-Pore Octadecyl (C18) Prep LC Packing. The chemical procedure to synthesize such porous particles 16 is the interaction of hydroxyl-containing silica with organosilicon compounds of the formula $R_{4-n}SiX_n$, where X is CI, $OCH_3$, $OC_2H_5$, $N(CH_3)_2$, etc., where R is $C_nH_{2n+1}$ and where n is a positive integer. Owing to steric hindrance, the modification affects only about half of the surface silanol groups and, with bi- or trifunctional modifiers (n=2 or 3), a portion of reactive Si—X groups remains unreacted, thereby producing on hydrolysis additional hydroxyls at the anchor silicon atom. Due to the chemical reaction with the n-alkylchlorosilanes, the silica cores 14 are coated by long organic chains on their surfaces to create nano-channels. Because the organic chains are hydrophobic, the water-based magnetic fluids 12 stay outside the porous particles 16 when at rest. When subjected to magnetic fields and placed under compression, the water-based magnetic fluids 12 are forced into the nano-channels of the porous particles 16 by overcoming surface tension. Since the surface tension of the magnetic fluids 12 is affected by the applied magnetic fields, the damping force is therefore also affected by the magnetic fields. This principle is the fundamental mechanism for the damping effect of the proposed damping material 36 and the technique for on-demand control the damping factor of the material 36.

Figure 1B:
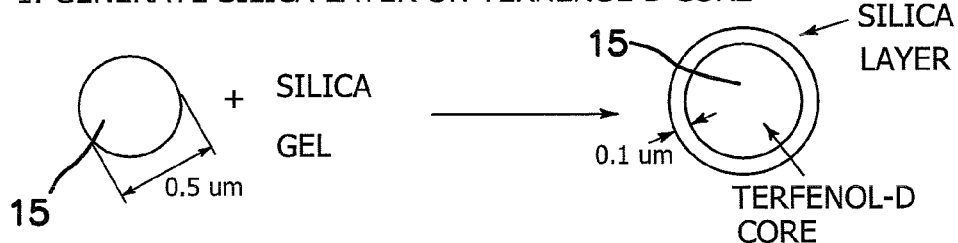
FIG. 1b is a diagram illustrating the fabrication process of damping medium in another embodiment.
Figure 1B:
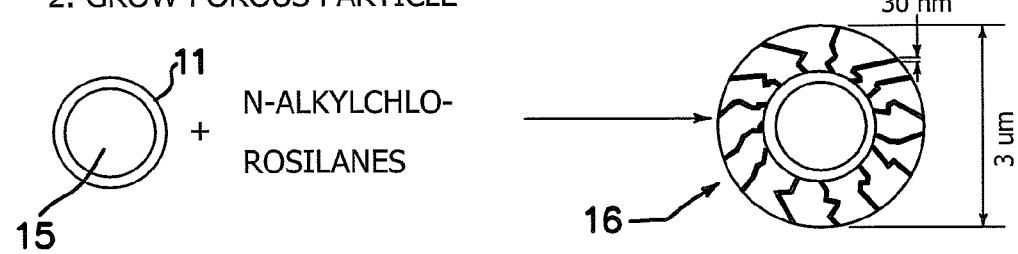
Figure 1B:
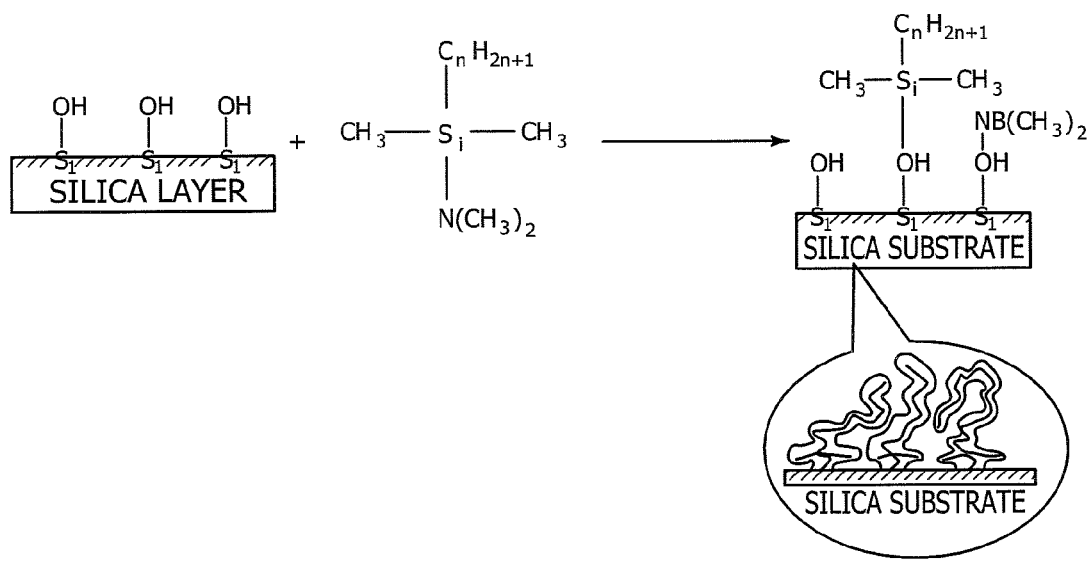
Figure 1B:
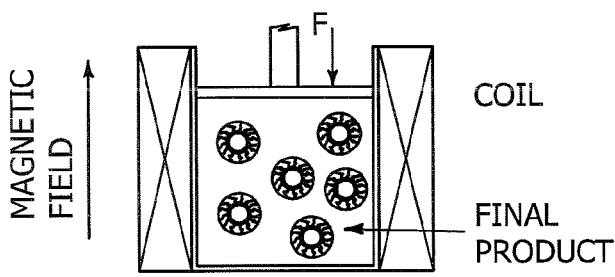

In another embodiment the damping material 36 is fluid suspension, composed of nanometer-sized ferrous particles 10, light mineral oil or other conventional damping fluid and micrometer-sized organic porous particles 16 with ferrous cores 15. The damping medium of this embodiment is fabricated by the procedures as illustrated in FIG. 1b. First, Terfenol-D particles or ferrous cores 15 (diameter of 0.5 μm) are coated with silica layer 11 by physical deposition methods. Second, the silica coated Terfenol-D particles or cores 15, 11 are reacted with n-alkylchlorosilanes to produce organic and hydrophobic long chains. The silica layer 11 reacts with n-alkylchlorosilanes to produce organic and hydrophobic long chains. The Terfenol-D particles are first coated with thin silica layer by physical vapor deposition (PVD). The coated particles will react with n-alkylchlorosilanes by the similar chemical methods described above to produce long organic chains on the silica surface. The chains are folded automatically to form a dense network with many nanometer-sized channels. Finally, the fabricated porous particles 16, now swollen to about 3 μm are dispersed in light mineral oils with nanometer-sized ferrous particles 10 using blenders to comprise the damping material 36. The key advantage of the dampers based on the disclosed material 36 is that they are characterized by low-heat generation (about 10% that of current hydraulic dampers), high damping efficiency (twice as much as current hydraulic dampers) and smooth on-demand controllable damping curves.

The damping material is composed of porous microparticles 10 suspended in distilled water 12 as illustrated in FIG. 1a. The porous particles 10 are created with a silica core 14 and n-alkylchlorosilanes. The chemical reaction between the silica core 14 and the alkylchlorosilanes generates a coating of long organic chains 16 on the surface of silica core 14. In a proto-type damper design, the porous particles 10 are cured by 8-alkylchlorosilanes. They have a spherical shape with 15 micrometer average diameter and the pore size (channel) is 30 nanometers. Since the long chains are organic and hydrophilic, distilled water cannot penetrate into the porous particles 10 if no pressure above atmospheric levels is applied.

Fundamentally, the damping material comprised of the particles 10 and the fluid 12 has a nano-scale damping mechanism when it is subjected to magnetic field and cyclic mechanical loading. The water-based magnetic fluids (nanometer-sized ferrous particles 10 and distilled water 12) are forced to flow into the nano-channels of porous particles 10. Since the interaction between fluid molecules is high, they are susceptible to being captured or aggregated into clusters with a size varying from 2 to 10,000 molecules. The size of the clusters depends on the temperature and the motion of the fluid. In the case of nanometer scale flows (where the nano-flow Knudson number is less than 0.01), the clusters are normally oriented along the channels of particles 10 to form strips, flowing with boundary and inter-strip slip. The Knudson number is a nondimensional parameter related to the distance between molecules. In such nano-flows, the streamlines are identical with those of in-viscid flows. Consequently, the inter-friction and hence the heating of the fluid are negligible. The nano-flow mechanism is illustrated in the diagram of FIG. 1c. At the nanoscale the magnetic fluid gets into the 30 nm channels of particle 16 under applied pressure by overcoming surface tension resistance, which is a function of the applied magnetic field. The functional dependence of the nanochannels is due to the giant magnetostrictive effect of the Terfenol-D cores and/or the applied field. At the microscale the porous particles 16 themselves form chains along the direction of the magnetic field to resist the viscous flow of the damping material 36.

Figure 2:
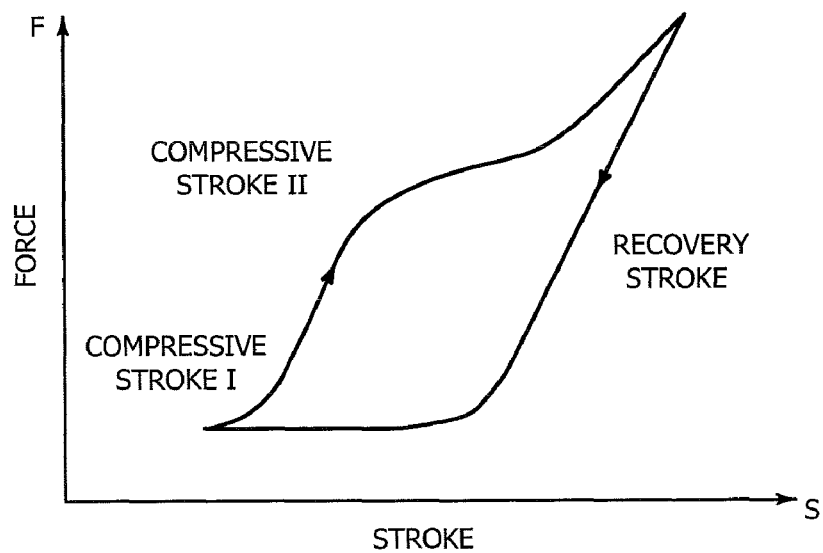
FIG. 2 is a graph in the configuration space of stroke and force of the hysteresis loop of a colloidal damper according to the invention.

The principle of the damping mechanism of such nano-flows can be explained through the change in the potential energy component of the internal energy. These changes are possible if the potential energy component is higher than the kinetic energy component, which occurs when the cluster size exceeds a certain critical value. Mathematically, let us consider that the fluid outside a nano-channel with a diameter of a is subjected to pressure. At rest, the fluid cannot flow into the nano-channels due to surface tension. During a compressive stroke, the contacting angle between the fluids and the boundary of the nano-channel increases to approach $\theta_c$. The fluids flow into the channels by overcoming the pressure or resistance due to surface tension, which is $$p_c = -2\frac{\sigma \cos\theta_c}{a},$$

where σ is the surface tension of fluids 12. During recovering stroke, the fluid in the nano-channel flows out and the contacting angle changes to $\theta_r$. The pressure or resistance during the recovering stroke is $p_r=-2\sigma \cos \theta_r/a$. Normally, $\theta_c$ is different from $\theta_r$. Due to the difference between $\theta_c$ and $\theta_r$, the pressure will define hysteresis loops in the pressure vs. stroke domain, as illustrated in FIG. 2.

Figure 3B:
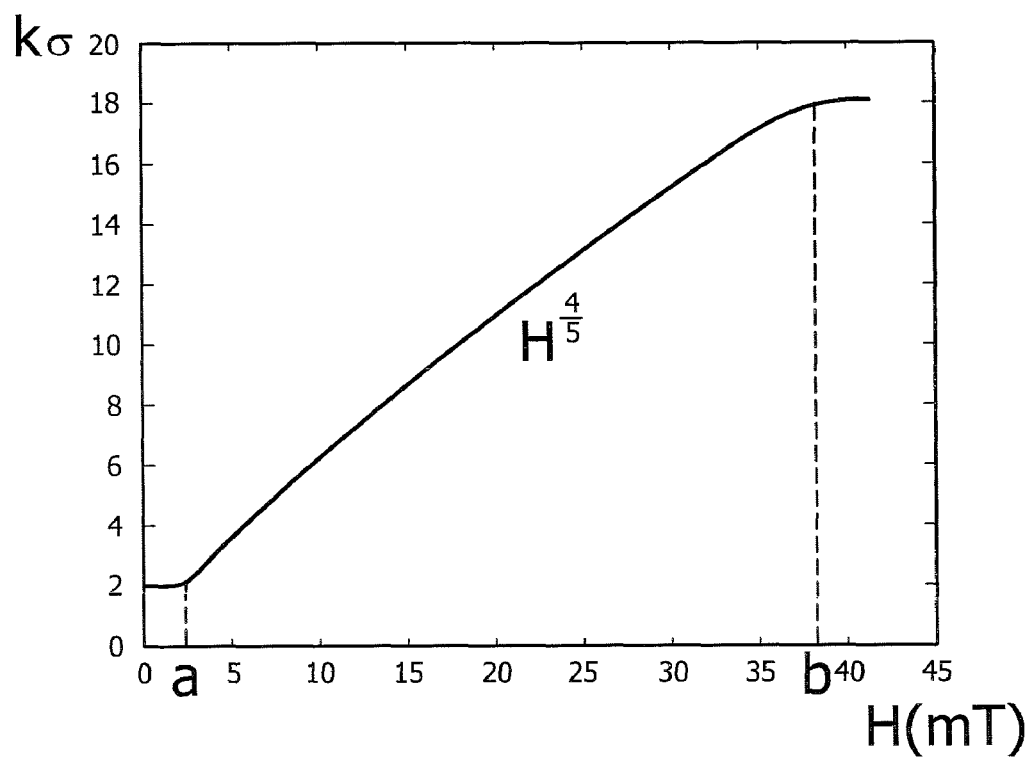
FIG. 3b is a graph of the surface tension of the ferrofluid as a function of magnetic field.

Therefore, the damping mechanism at nanoscale are: (1), phenomenally, the difference of the contacting angles between compressive stroke and recovering stroke causes the damping; and (2) the surface tension coefficient governs the amplitude of the energy dissipated per cycle. For magnetic fluids, it was reported that the contacting angle changes little with applied magnetic fields but the surface tension increases by the order of H.sup.4/5 before magnetic saturation occurs, where H is the magnetic field strength. FIG. 3b is a graph illustrating the dependence of surface tension on magnetic field strength. Due to these mechanisms, the energy dissipated per cycle by the nano-flow in the channels of porous particles 10 can be controlled on-demand by applied magnetic fields and the highly efficient dissipation procedure will generate very little heat.

Figure 3A:
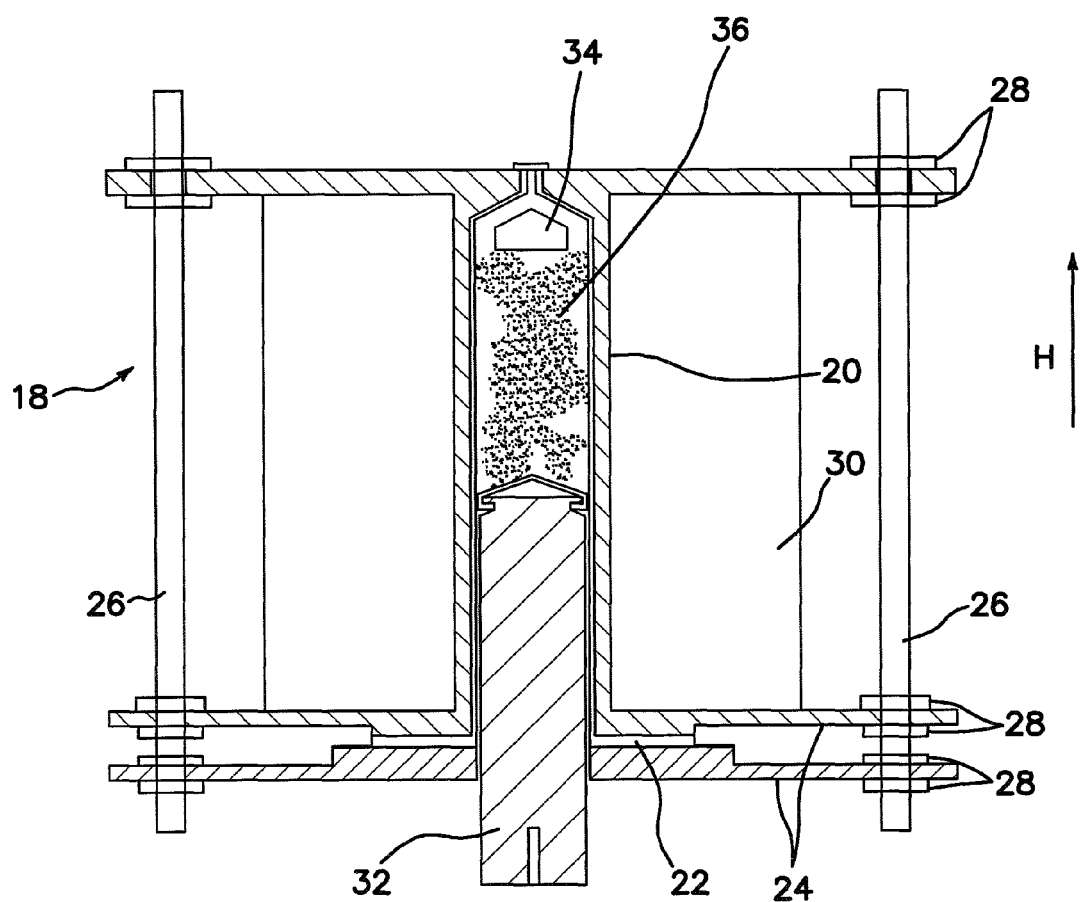
FIG. 3a is a schematic of a prototype smart colloidal damper.
Figure 4A:
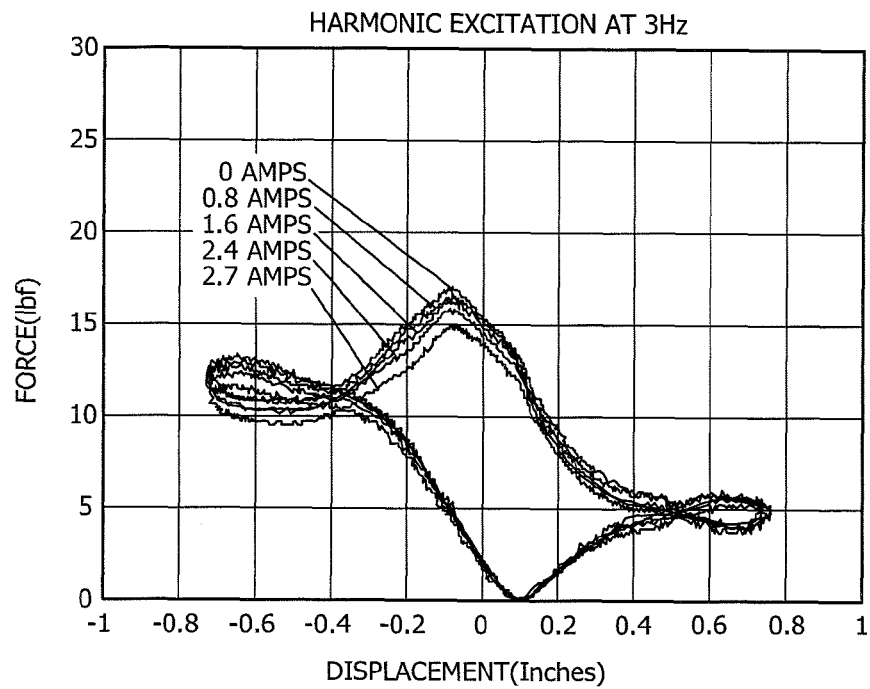
FIGS. 4a-4e are graphs of the hysteresis loops of the damping material in the configuration space of force-displacement with the damper of FIG. 3a driven at the harmonic frequencies of 3, 6, 14, 16 and 20 Hz respectively.
Figure 4B:
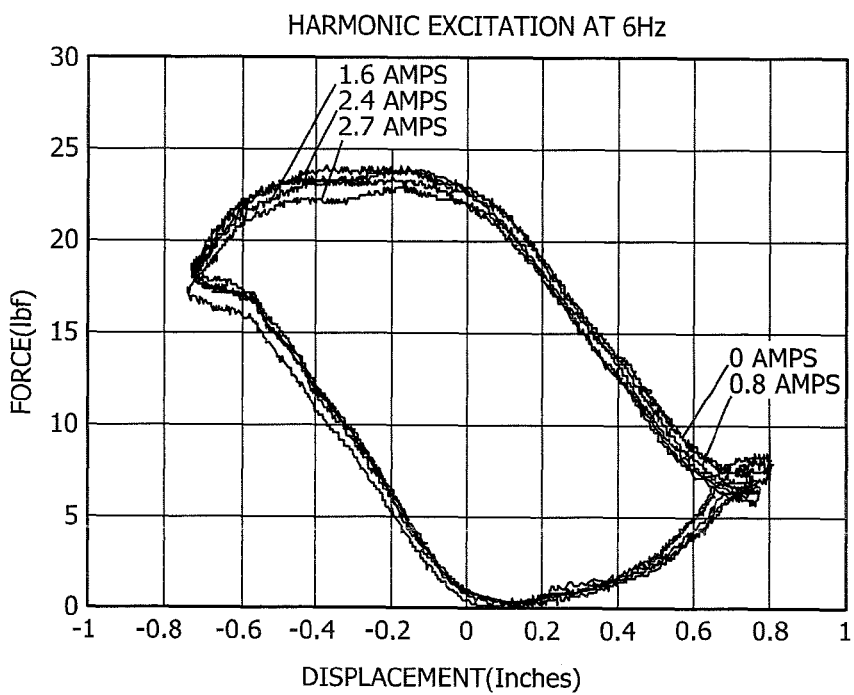
Figure 4C:
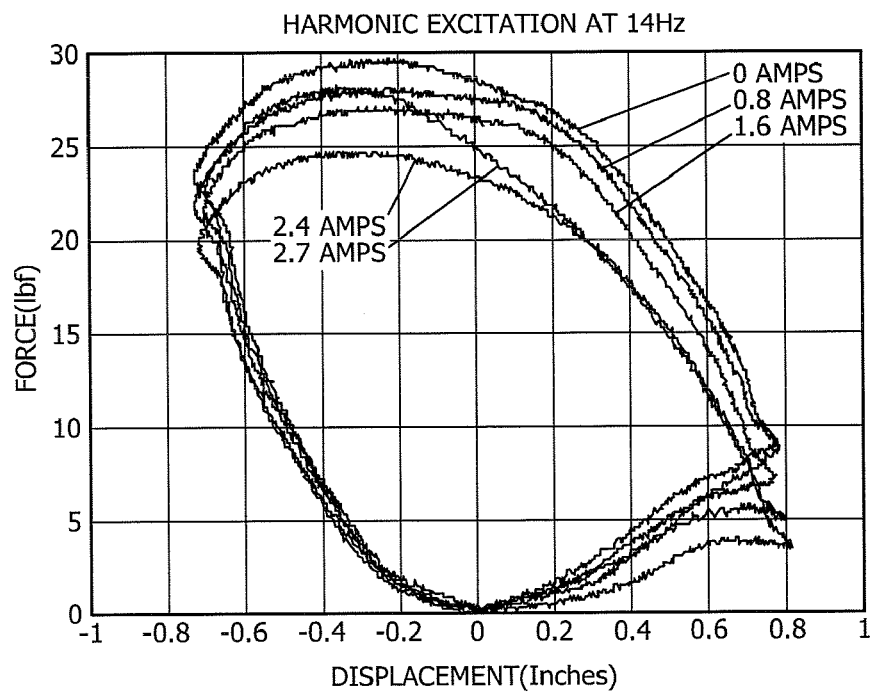
Figure 4D:
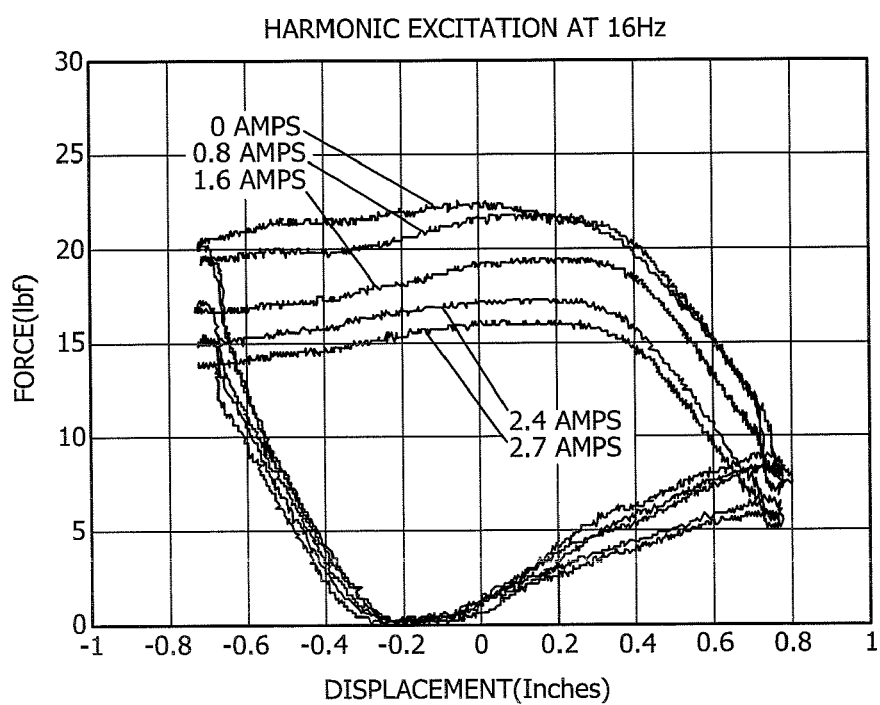
Figure 4E:
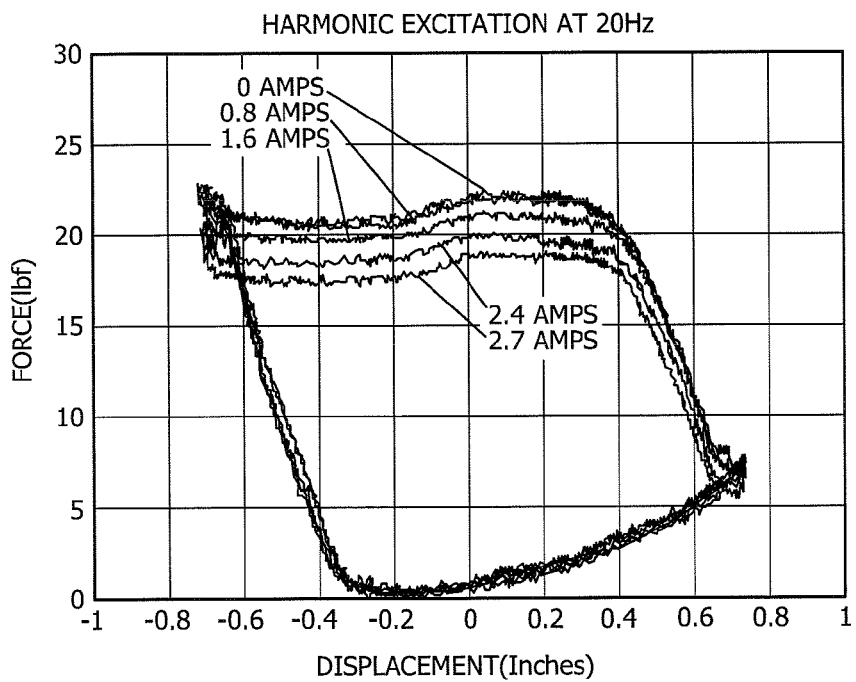
Figure 5A:
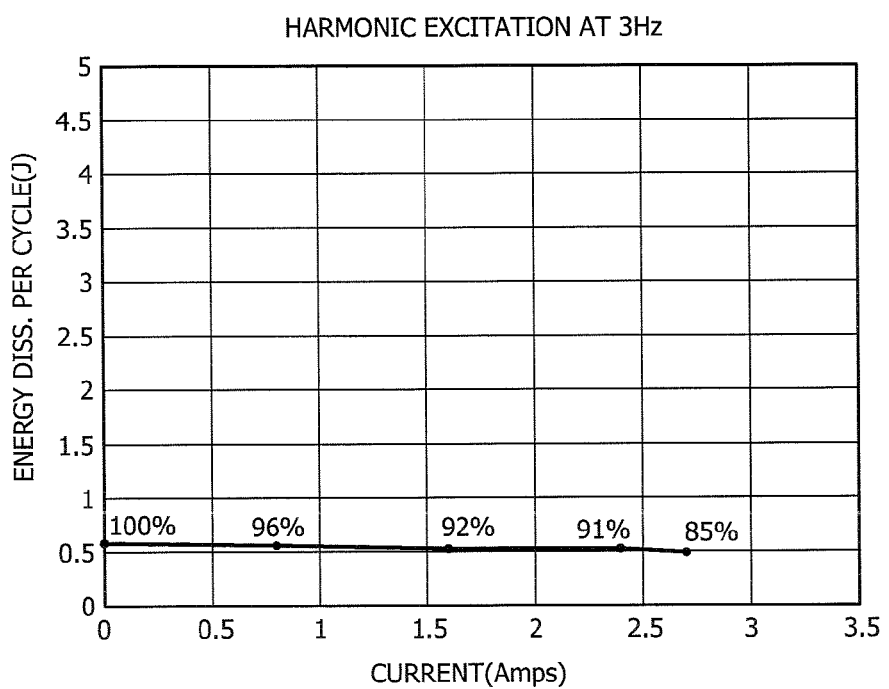
FIGS. 5a-5e are graphs of the energy dissipated per cycle of the damping material as a function of the current supplied to the magnetic coil windings corresponding to the cycling of the damper of FIG. 3a at the harmonic frequencies of 3, 6, 14, 16 and 20 Hz respectively.
Figure 5B:
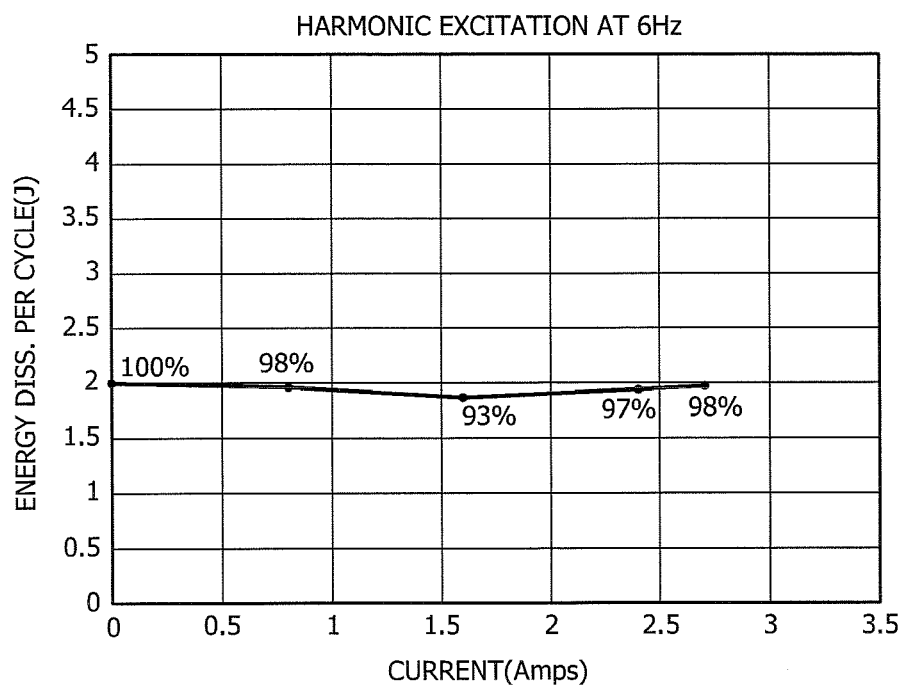
Figure 5C:
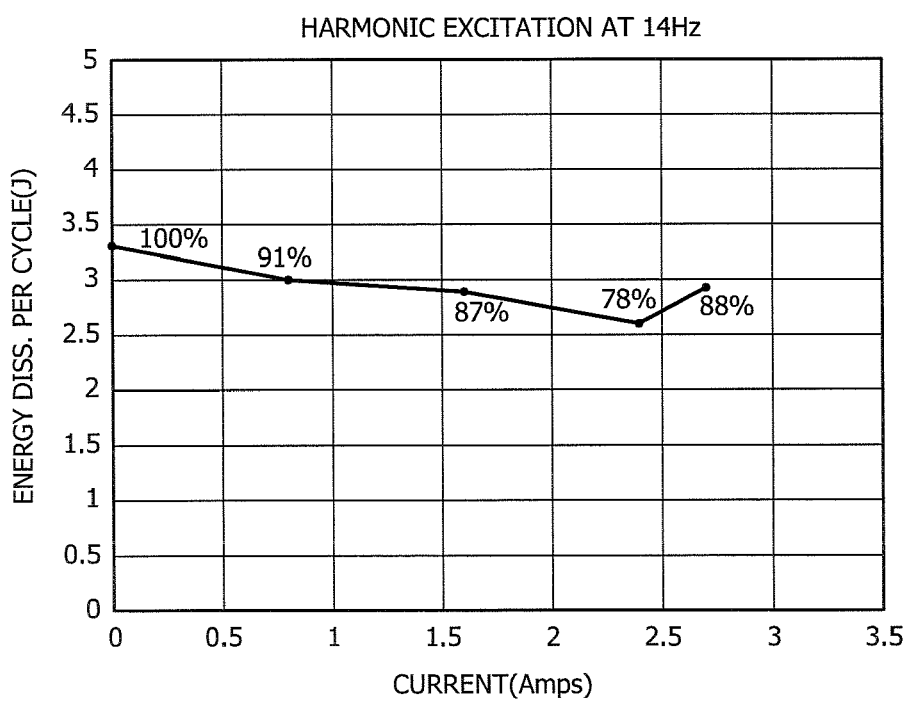
Figure 5D:
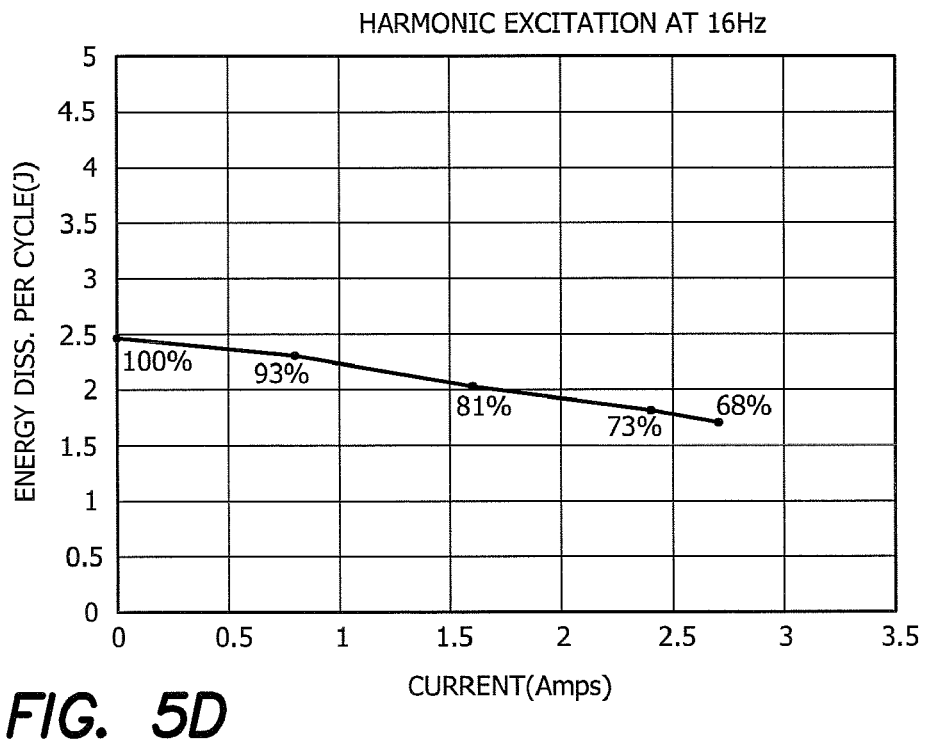
Figure 5E:
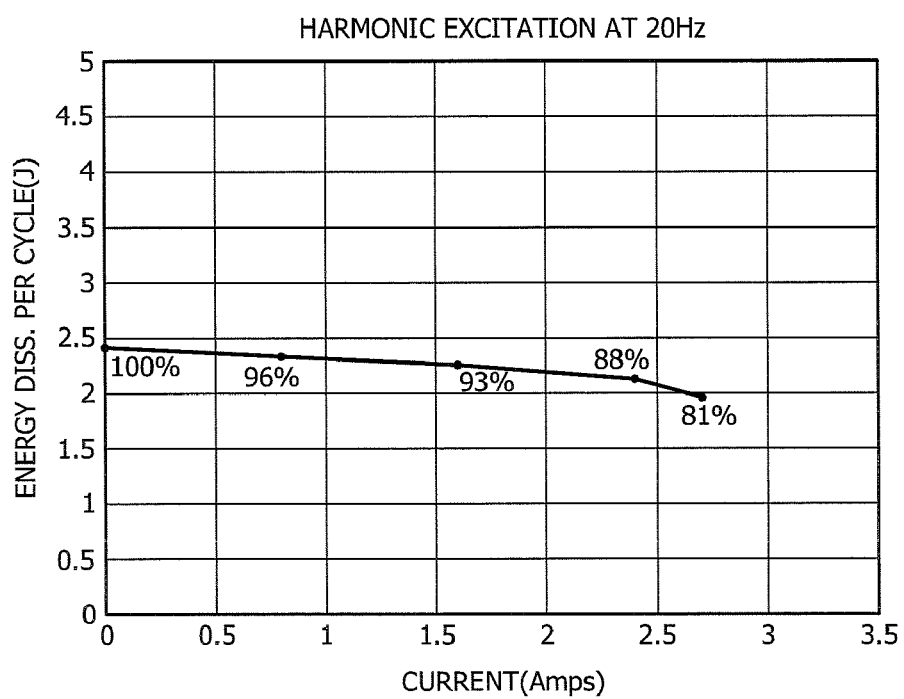

A prototype smart colloidal damper is disclosed in FIG. 3a. It is to be understood that many other damper designs could employ the damping fluid of the invention and the scope of the invention contemplates not only the illustrated embodiment of the design in FIG. 3a, but all known or later devised damper designs where the disclosed damping fluid could be inherently used or the damper design adapted to be use the disclosed damping fluid. The damper 18 is composed of an aluminum or nonmagnetic outer cylinder 20 with a plastic inner cylinder 22 held in place by bottom covers 24 clamped by a plurality of tie rods 26 and nuts 28. Outside the aluminum cylinder 20, an eighteen-layer magnetic coil 30 is installed to generate uniform magnetic field inside the aluminum cylinder 20 and also the plastic cylinder 22. The plastic inner cylinder 22 is used to reduce oil seal friction. A copper shaft 32 is inserted into the plastic cylinder 22 and the plastic cylinder 22 is filled with a valve 34 in the top of cylinder 22. The plastic cylinder 22 is then installed into the aluminum cylinder 20 by tightening the bottom covers 24 and the top valve 34 is closed. Any type of design to compress the disclosed smart colloidal damping material 36 in the presence of a magnetic field could be employed other than that shown in the illustrated embodiment of FIG. 3a.

The hysteresis loops in force-displacement configuration space of damper 18 of FIG. 3a has been tested under harmonic displacement excitations and the results are shown in FIGS. 4a-4e for harmonic excitation at 3, 6, 14, 16 and 20 Hz respectively. The dissipated energy per cycle against applied magnetic fields under different harmonic excitations is shown in corresponding FIGS. 5a-5e at 3, 6, 14, 16 and 20 Hz respectively. It can be shown that the energy dissipated per cycle can be changed by applied magnetic fields on demand by up to 35%.

Figure 6A:
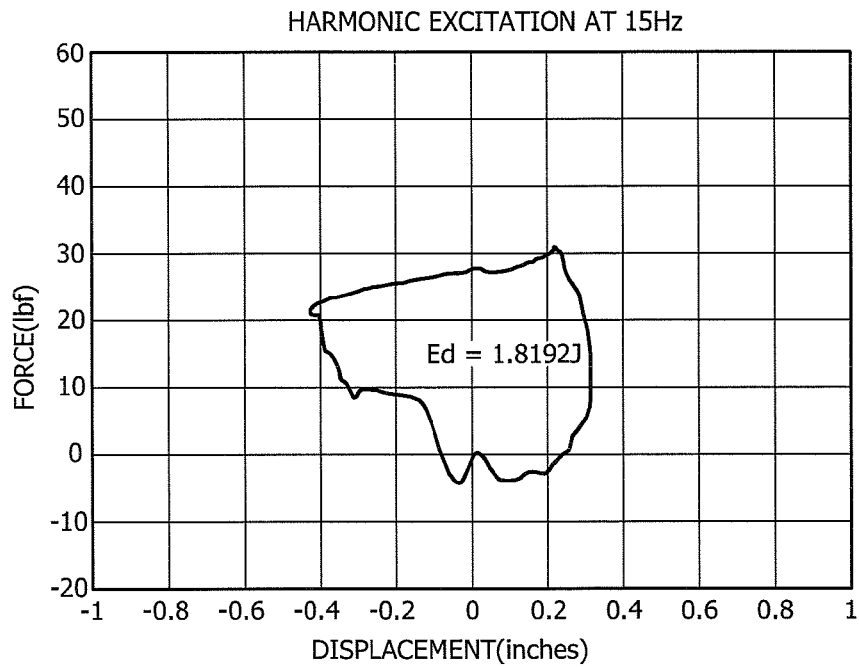
FIG. 6a is a graph of the hysteresis loops of the damping material in the configuration space of force-displacement with a conventional hydraulic damper.
Figure 6B:
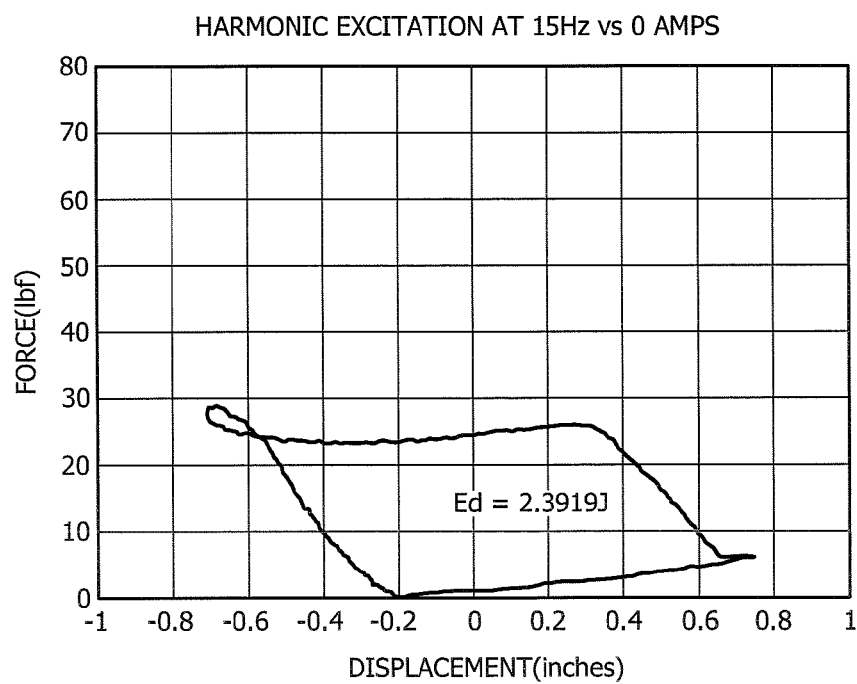

As discussed above, conventional hydraulic converts input mechanical energy into thermal energy, which will cause the temperature to increase dramatically. Sealing materials for hydraulic dampers are always rubber, which tend to fail under high temperature. This thermal problem greatly harms the durability of dampers. However, colloidal dampers do not convert energy into thermal energy to the same extent. So, their heat generation is very much lower than that of conventional hydraulic dampers. To verify the above, we selected a hydraulic damper GDE50-E from H. A. Guden Co. Inc and compare its heat generation to that of the colloidal damper of FIG. 3a. All the tested dampers are all coated with cotton and operated under a thermally isolated condition. Their temperature rise is a direct index of their heat generation rates. FIGS. 6a and 6b respectively present the hysteresis loops of the hydraulic damper and the prototype smart colloidal damper with magnetic field is off under harmonic excitations of 15 Hz. It can be shown that the energy dissipated per cycle by the hydraulic damper is 1.82 J while that of the colloidal dampers is 2.39 J. The colloidal damper dissipates more energy than the hydraulic damper.

Figure 7:
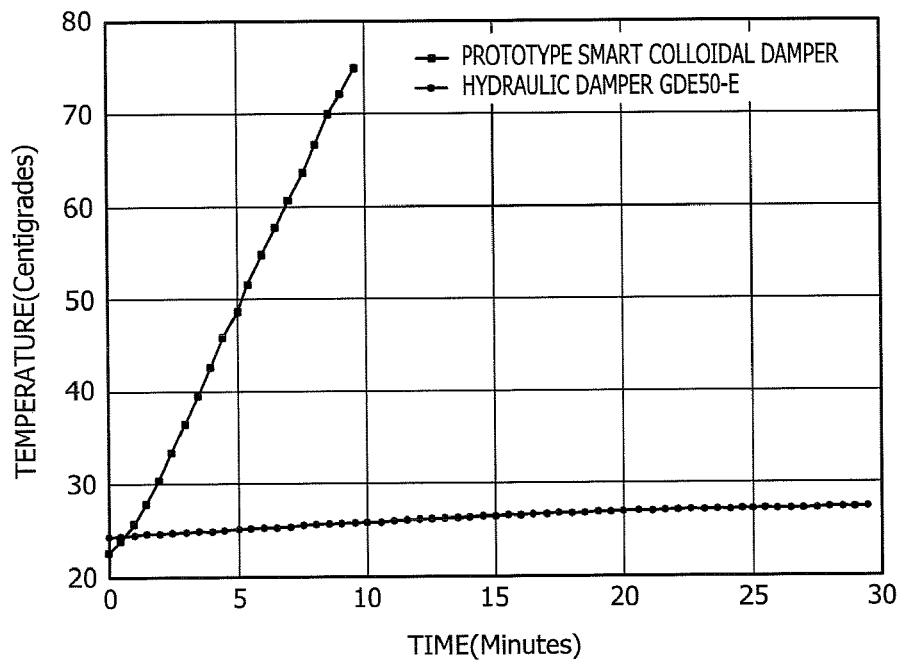
Figure 8:
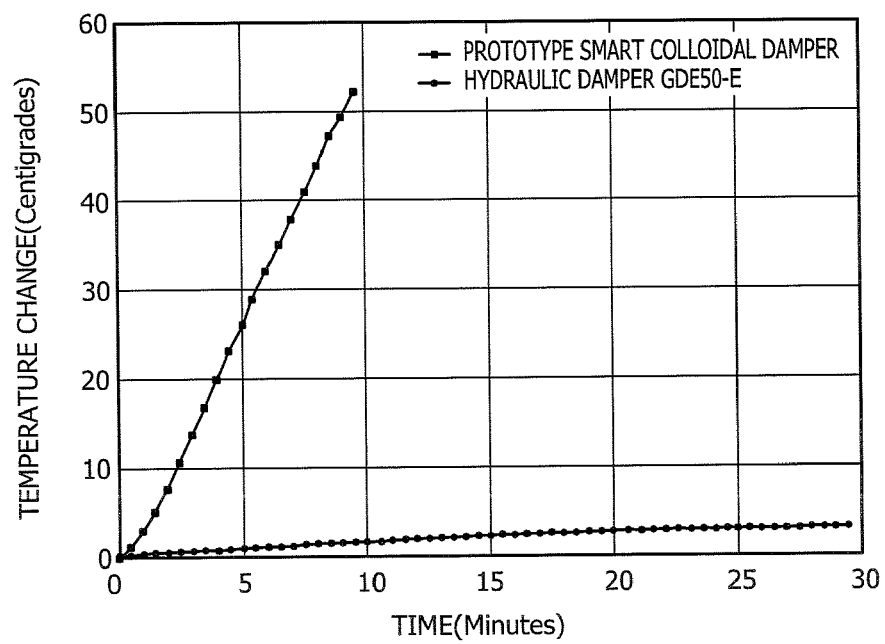

FIG. 7 presents the temperatures of a conventional hydraulic damper and the colloidal damper of FIG. 3a as a function of time, when driven at a cycling frequency of 15 Hz. FIG. 8 also shows the temperature change or rise of the same two dampers of FIG. 7 as a function of time. We can see that (1) the temperature of the hydraulic damper rises above 55 centigrade within 9 minutes; and (2) the temperature of the prototype smart colloidal damper of FIG. 3a when the field is off rises about 4 centigrade within 30 minutes. Colloidal dampers generate substantially less heat than that of hydraulic dampers.

In summary, the dampers using the disclosed damping media 36 possess the following characteristics: (1) lower heat generation (less than 10% of hydraulic dampers); (2) on-demand controllable damping curves; (3) a considerably large stroke at the same order of that provided by hydraulic dampers together with a high damping force; and (4) excellent long-term stability with easy mechanical configurations.

The potential application of the dampers with on-demand controllable damping curves is significant, including for example: adaptable vibration reduction and NVH (noise, vibration and harness) improvements in high performance vehicles; adaptive vibration control for seismic protection of civil structures; vibration control of sophisticated apparatus, and vibration control of aero-structures. It is to be understood that the range of application is nearly limitless and is not complete here. Normally, vibrations occur everywhere in the world and most of them are harmful. Currently, to isolate vibration or to mitigate vibration, we always use shock absorbers or dampers to tune dynamic systems. Mechanically, the disclosed dampers replace all these conventional dampers without changing the configuration of host structures. Meanwhile, sensors can be installed on the host structures to measure the instant vibrations with the outputs of the sensors fed to a control circuit. The control circuit can output command signals to the dampers to change the magnetic fields in the dampers as well as their damping curves. As a result, the dynamic performance of the host structures installed with the proposed dampers are automatically changed to yield maximum vibration mitigation. This comprises the adaptive vibration control loop by utilizing the disclosed dampers.

The disclosed smart colloidal dampers have the following advantages over prior art smart dampers:
  (1) Easy fabrication, no orifices and no high-pressure gas chambers for high-frequency dynamic operation;
  (2) low heat generation and high damping efficient without using special valves to scarify the smoothness damping curves; and
  (3) wide range of on-demand shiftable damping curves (the dissipated energy per cycle can be changed up to 35% on-demand).

Thus, combined with best electrical control circuits and appropriate control strategies, suspension systems by utilizing the disclosed dampers yield exceptional vibration mitigation performance.

Figure 9:
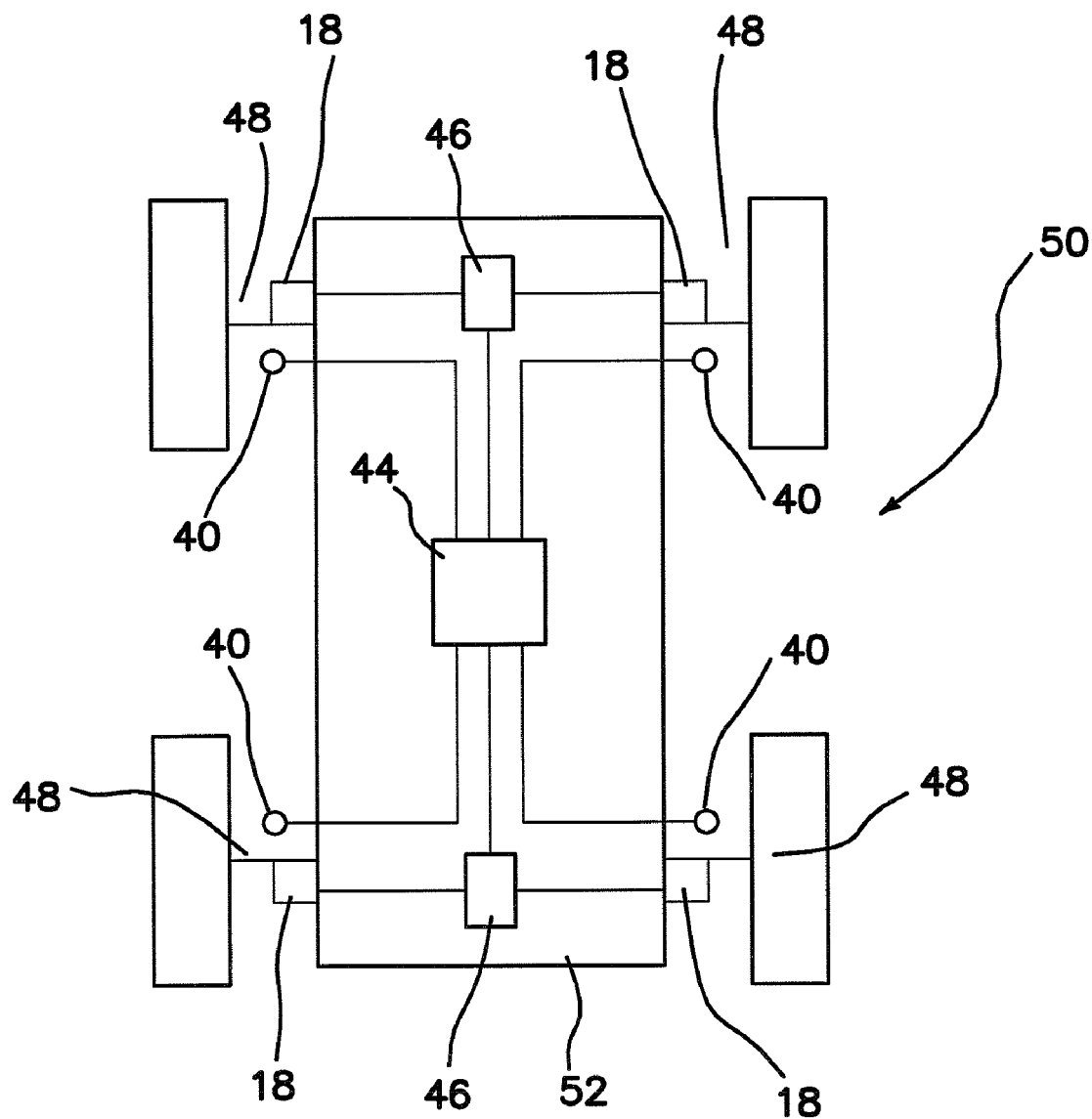
FIG. 9 is a block diagram of a vehicle in which smart colloidal dampers are employed in an adaptive system.

The following is a representative example of the kind of application that can be realized. For each vehicle 50 as diagrammatically depicted in FIG. 9, there are four shock absorbers 18 installed on the chassis 52 to isolate vibration from roads, one in each wheel suspension subsystem 48.

Currently, the shock absorbers are all hydraulic passive devices. The disclosed dampers 18 replace these four conventional shock absorbers. Sensors 40 are installed on the body-frame 42 of the vehicle to measure the vibrations. The outputs of the sensors 40 are connected to a central control circuit 44, where a control strategy is embedded. By referring the instant vibrations and the vibration history, the central control circuit 44 outputs command signals to an electrical power amplifier(s) 46 to change the electrical currents to the dampers 18. Consequently, the damping curves of the dampers 18 are changed according to the command signals from the central control circuit 44 and the dynamic performance of the whole vehicle changes. This process happens within milliseconds due to the quick response of the dampers. Therefore, the vibration of the body frames is adaptively mitigated.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for use on a host structure comprising:
   a damper;
   a source of magnetic field coupled to the damper;
   a colloidal magnetic fluid three phase constituent damping medium disposed in the damper;
   a sensor installed on the host structure to measure vibrations; and
   a vibration control circuit, an output of the sensor being fed back to the control circuit, which outputs a command signal to the source of the magnetic field applied to the damper to change the magnetic field in the damper as well as its damping curve so that the dynamic performance of the host structure installed with the damper is changed automatically to yield maximum vibration mitigation,
   wherein the damping medium comprises a suspension of nanometer-sized ferrous particles and micrometer-sized porous silica particles in a fluid, wherein the nanometer-sized ferrous particles and fluid enter the micrometer-sized porous silica particles upon application of a magnetic field and mechanical load to dissipate energy by alteration of the effective viscosity of the damping medium in the damper.

2. The apparatus of claim 1 where the colloidal magnetic fluid three phase constituent damping medium is characterized by an on-demand controllable loss-factor.

3. The apparatus of claim 1 where the colloidal magnetic fluid three phase constituent damping medium comprises a mixture of nanometer-sized ferrous particles and micrometer-sized porous silica particles with ferrous cores in light mineral oil, wherein the micrometer-sized porous particles and nanometer-sized particles interact to provide damping dissipation of energy on at least two different scales of magnitude.

4. The apparatus of claim 1 where the colloidal magnetic fluid three phase constituent damping medium comprises a mixture of nanometer-sized ferrous particles and micrometer-sized porous silica particles in water, wherein the micrometer-sized porous particles and nanometer-sized particles interact to provide damping dissipation of energy on at least two different scales of magnitude.

5. The apparatus of claim 3 where porous silica particles have micro-meter sized ferrous giant magnetostrictive cores and with long organic chains on the surface to provide nano-channels.

6. The apparatus of claim 1 where the vibration control circuit is arranged and configured to control the damper to provide adaptable vibration reduction and improvements in noise, vibration, and harshness of high performance vehicles, adaptive vibration control for seismic protection of civil structures, vibration control of apparatus, or vibration control of aero-structures.

7. The apparatus of claim 1 where the colloidal magnetic fluid three phase constituent damping medium comprises magnetostrictive particles or ferrous particles (diameter of 0.5 μm) coated with a silica layer by physical deposition methods, wherein the coated magnetostrictive particles or cores are reacted with n-alkylchlorosilanes to produce organic and hydrophobic long chains, which fold automatically to form a dense network with a multiplicity of nanometer-sized channels to form fabricated porous particles which are dispersed as nanometer-sized particles by being blended into light mineral oils or water.

8. The apparatus of claim 7 where a magnetic fluid is comprised of the nanometer-sized ferrous particles dispersed into a fluid, when subjected to the magnetic field and cyclic mechanical loading, is forced to flow into the nano-channels of the porous particles, and to form clusters of porous particles with a size varying from 2 to 10,000 molecules depending on the temperature and the motion of the fluid, and where the nano-flow and Kundsen number is less than 0.01, the clusters being at least in part oriented along the channels to form strips, flowing with boundary and inter-strip slip.

9. The apparatus of claim 1 where the host structure is a vehicle, and further comprising a power amplifier, a plurality of the corresponding sensors, sources and dampers used as shock absorbers installed on the vehicle to isolate it from vibration, the plurality of sensors installed on the vehicle to measure the vibrations, the outputs of the sensors being communicated to the control circuit, where a control strategy is stored, where by referring the instant vibrations and the vibration history the control circuit generates output command signals to the power amplifier to change the electrical currents to the plurality of magnetic field sources, the damping curves of the dampers being changed according to the plurality of command signals from the control circuit and the dynamic performance of the vehicle being changed to adaptively mitigated vibration.

10. A colloidal magnetic fluid three phase constituent damping medium in a damper comprising a suspension of nanometer-sized ferrous particles and micrometer-sized porous silica particles in a fluid, wherein the nanometer-sized ferrous particles and fluid enter the micrometer-sized porous silica particles upon application of a magnetic field and mechanical load to dissipate energy by alteration of the effective viscosity of the damping medium in the damper.

11. The colloidal magnetic fluid three phase constituent damping medium of claim 10 where the porous silica particles have a ferrous core and where the fluid comprises a mineral oil.

12. The colloidal magnetic fluid three phase constituent damping medium of claim 10 where the porous silica particles are nonferrous and where the fluid comprises water.

13. The colloidal magnetic fluid three phase constituent damping medium of claim 10 where the porous silica particles comprise solid silica cores reacted with n-alkylchlorosilanes to produce a silica core with an organic coating of nano-channels.

14. A method comprising:
generating a magnetic field of a selective strength in a damper;
providing a suspension of nanometer-sized ferrous particles and micrometer-sized porous silica particles in a fluid in the damper;
subjecting the suspension and the fluid in the damper to the generated magnetic field;
cyclically forcing the nanometer-sized ferrous particles and fluid to enter the micrometer-sized porous silica particles upon cyclical application of the magnetic field and mechanical load; and
dissipating energy by cyclical alteration of the effective viscosity of the damping medium in the damper by the cyclical alteration of the selective strength of the magnetic field.

15. The method of claim 14 where the suspension of nanometer-sized ferrous particles and micrometer-sized porous silica particles in the fluid is constituted to have an interaction between fluid molecules which is sufficiently high when cyclically mechanically loaded to promote capture or aggregation of the porous particles into clusters with a size varying from 2 to 10,000 molecules, the size of the clusters being dependant on the temperature and the motion of the damping medium.

16. The method of claim 15 where the suspension of nanometer-sized ferrous particles and micrometer-sized porous silica particles in the fluid is constituted to have a nano-flow Knudson number is less than 0.01 when cyclically mechanically loaded so that the clusters are normally oriented along the channels of the porous particles to form strips, flowing with boundary and inter-strip slip.

17. The method of claim 14 further comprising:
sensing vibrations with a sensor installed on a host structure; and
generating a command signal to a source of the magnetic field applied to the damper to change the magnetic field in the damper as well as its damping curve so that the dynamic performance of the host structure installed with the damper is changed automatically to yield maximum vibration mitigation.

18. The method of claim 17 where generating a command signal comprises generating a command sign to provide an on-demand controllable loss factor.

19. The method of claim 18 where generating a command signal comprises controlling the damper to provide adaptable vibration reduction and improvements in noise, vibration, and harshness of high performance vehicles, adaptive vibration control for seismic protection of civil structures, vibration control of method, or vibration control of aero-structures.

20. The method of claim 17 where the host structure is a vehicle, and further comprising providing dampers as shock absorbers installed on the vehicle to isolate it from vibration, measuring the vibrations, communicating the measured vibrations to a control circuit, where a control strategy is stored, referring to the measured vibrations and a vibration history to generate a corresponding plurality of command signals to a corresponding plurality of power amplifiers or a multiplexed power amplifier, generating a plurality of corresponding coil currents from the amplifier or amplifiers, changing a corresponding plurality of electrical currents to corresponding magnetic field sources for each damper, the damping curves of each dampers being changed according to the corresponding command signal from the control circuit and changing the dynamic performance of the vehicle to adaptively mitigated vibration.

* * * * *